US012637881B2

(12) United States Patent
Sanchez Rojas et al.

(10) Patent No.: US 12,637,881 B2
(45) Date of Patent: May 26, 2026

(54) POWER RELEASE LATCH WITH IMPACT REDUCER FEATURE

(71) Applicant: INTEVA PRODUCTS, LLC, Troy, MI (US)

(72) Inventors: Hector Sanchez Rojas, Ciudad Juarez (MX); Pedro Alfredo Alvarado Heredia, Ciudad Juarez (MX); Jesus Osvaldo Alvarez Morales, Ciudad Juarez (MX); Miguel Angel Baray Gonzalez, Ciudad Juarez (MX); Victor Daniel Varela Antillon, Ciudad Juarez (MX)

(73) Assignee: INTEVA PRODUCTS, LLC, Troy, MI (US)

( * ) Notice: Subject to any disclaimer, the term of this patent is extended or adjusted under 35 U.S.C. 154(b) by 383 days.

(21) Appl. No.: 17/897,902

(22) Filed: Aug. 29, 2022

(65) Prior Publication Data

US 2024/0068277 A1 Feb. 29, 2024

(51) Int. Cl.

| | |
|---|---|
| ***E05B 81/06*** | (2014.01) |
| ***E05B 77/42*** | (2014.01) |
| ***E05B 81/14*** | (2014.01) |
| ***E05B 81/30*** | (2014.01) |
| ***E05B 81/34*** | (2014.01) |
| ***E05B 81/42*** | (2014.01) |
| ***E05B 83/36*** | (2014.01) |

(52) U.S. Cl.

CPC .............. *E05B 81/06* (2013.01); *E05B 77/42* (2013.01); *E05B 81/14* (2013.01); *E05B 81/30* (2013.01); *E05B 81/34* (2013.01); *E05B 81/42* (2013.01); *E05B 83/36* (2013.01)

(58) Field of Classification Search

CPC .......... E05B 77/36; E05B 77/38; E05B 77/42; E05B 81/06; E05B 81/14; E05B 81/30; E05B 81/34; E05B 81/36; E05B 81/42

See application file for complete search history.

(56) References Cited

U.S. PATENT DOCUMENTS

| | | | |
|---|---|---|---|
| 7,029,039 | B2 | 4/2006 | Rathmann et al. |
| 9,156,383 | B2 | 10/2015 | Handl |
| 9,869,113 | B2 | 1/2018 | Janssen et al. |

(Continued)

FOREIGN PATENT DOCUMENTS

| | | |
|---|---|---|
| CN | 104245415 A | 12/2014 |
| CN | 104420737 A | 3/2015 |

(Continued)

OTHER PUBLICATIONS

Machine translation for DE 19913666 A1 (Year: 2000).*

CNIPA Notification of the First Notice to Make Rectification corresponding to CN Application No. 2024040101016300; Issue Date, Apr. 1, 2024.

CNIPA Notification of First Office Action corresponding to CN Application No. 202311083038.5; Issue date, Nov. 6, 2025, 15 pages.

*Primary Examiner* — Christine M Mills
*Assistant Examiner* — Christopher F Callahan
(74) *Attorney, Agent, or Firm* — CANTOR COLBURN LLP

(57) ABSTRACT

A vehicle latch, including: a power release mechanism for transitioning the vehicle latch from a latched state to an unlatched state, the power release mechanism includes a motor that rotates a worm that meshingly engages a power release gear, which is operably coupled to a pawl of the latch; and a spring provided to reduce a speed of the gear as it is back driven into a home position.

18 Claims, 7 Drawing Sheets

(56) References Cited

U.S. PATENT DOCUMENTS

| | | | | |
|---|---|---|---|---|
| 11,007,972 | B2 | 5/2021 | Miller et al. | |
| 11,377,883 | B2 | 7/2022 | Taurasi et al. | |
| 2005/0145740 | A1 | 7/2005 | Rathmann et al. | |
| 2005/0184534 | A1* | 8/2005 | Oberheide | E05B 81/14 292/201 |
| 2010/0223968 | A1* | 9/2010 | Krueger | E05B 81/06 70/283.1 |
| 2015/0054320 | A1 | 2/2015 | Handl | |
| 2015/0184432 | A1 | 7/2015 | Janssen et al. | |
| 2017/0138094 | A1* | 5/2017 | Taurasi | E05B 81/90 |
| 2018/0119461 | A1 | 5/2018 | Janssen et al. | |
| 2019/0092273 | A1 | 3/2019 | Miller et al. | |
| 2019/0161996 | A1 | 5/2019 | Taurasi et al. | |
| 2022/0282532 | A1 | 9/2022 | Taurasi et al. | |

FOREIGN PATENT DOCUMENTS

| | | | | |
|---|---|---|---|---|
| CN | 108533096 | A | 9/2018 | |
| CN | 109538035 | A | 3/2019 | |
| CN | 109989637 | A | 7/2019 | |
| CN | 221462096 | U | 8/2024 | |
| DE | 19913666 | A1 * | 9/2000 | E05B 77/42 |
| DE | 10251382 | A1 | 5/2004 | |
| EP | 2803794 | A2 * | 11/2014 | B60R 25/02 |
| WO | WO-9626341 | A1 * | 8/1996 | E05B 81/14 |

* cited by examiner

POWER RELEASE LATCH WITH IMPACT REDUCER FEATURE

TECHNICAL FIELD

Exemplary embodiments of the present disclosure pertain to the art of vehicle latches. More particularly, vehicle latches with power release mechanism.

BACKGROUND

Some vehicle side door latches with power release mechanism may jam thus not permitting the side door latch to complete all cycles required. It has been noticed that the jamming condition is presented after back drive operation only. For example, when power release at high voltage is done, a gear mechanism reaches a hard stop and a stall of the motor for a back drive function, then there is a high impact provided by the gear mechanism that may cause a loss of engagement between gear and worm teeth and therefore a jamming condition occurs. When this happens the motor is not able to move to a home/rest position with this condition.

BRIEF DESCRIPTION

A vehicle latch with a power release mechanism.

Disclosed is a vehicle latch, including: a power release mechanism for transitioning the vehicle latch from a latched state to an unlatched state, the power release mechanism includes a motor that rotates a worm that meshingly engages a power release gear, which is operably coupled to a pawl of the latch; and a spring provided to reduce a speed of the gear as it is back driven into a home position.

In addition to one or more of the features described above, or as an alternative to any of the foregoing embodiments, the spring has a leg that directly contacts a cam of the gear when the gear is rotated into the home position.

In addition to one or more of the features described above, or as an alternative to any of the foregoing embodiments, the spring is operably coupled to a cover of the vehicle latch at one end such that an end of the leg of the spring is free.

In addition to one or more of the features described above, or as an alternative to any of the foregoing embodiments, the cover is configured to be secured to a complimentary housing of the vehicle latch.

In addition to one or more of the features described above, or as an alternative to any of the foregoing embodiments, the leg of the spring is also configured to provide a depressed area that is configured to receive a complimentary portion of the cam when the gear is back driven to the home position.

In addition to one or more of the features described above, or as an alternative to any of the foregoing embodiments, the depressed area is curved.

In addition to one or more of the features described above, or as an alternative to any of the foregoing embodiments, the complimentary portion of the cam is a corner portion of the cam.

In addition to one or more of the features described above, or as an alternative to any of the foregoing embodiments, the depressed area is curved.

In addition to one or more of the features described above, or as an alternative to any of the foregoing embodiments, the gear is operably coupled to a power release lever, the power release lever being is operably coupled to a pawl release lever which is operably coupled to a pawl lifter that is operably coupled to the pawl.

Also disclosed is a method of slowing rotation of a gear of a power release mechanism of a vehicle latch, including: rotating the gear of the power release mechanism into a home position; and contacting and deflecting a spring secured to a cover of the vehicle latch with a cam of the gear as the gear is rotated into the home position by a motor, wherein the spring reduces a speed of the gear as it is back driven into the home position.

In addition to one or more of the features described above, or as an alternative to any of the foregoing embodiments, the spring has a leg that directly contacts the cam of the gear when the gear is rotated into the home position.

In addition to one or more of the features described above, or as an alternative to any of the foregoing embodiments, the spring is operably coupled to the cover of the vehicle latch at one end such that an end of the leg of the spring is free.

In addition to one or more of the features described above, or as an alternative to any of the foregoing embodiments, the cover is configured to be secured to a complimentary housing of the vehicle latch.

In addition to one or more of the features described above, or as an alternative to any of the foregoing embodiments, the leg of the spring is also configured to provide a depressed area that is configured to receive a complimentary portion of the cam when the gear is back driven to the home position.

In addition to one or more of the features described above, or as an alternative to any of the foregoing embodiments, the depressed area is curved.

In addition to one or more of the features described above, or as an alternative to any of the foregoing embodiments, the complimentary portion of the cam is a corner portion of the cam.

In addition to one or more of the features described above, or as an alternative to any of the foregoing embodiments, the depressed area is curved.

In addition to one or more of the features described above, or as an alternative to any of the foregoing embodiments, the gear is operably coupled to a power release lever, the power release lever being is operably coupled to a pawl release lever which is operably coupled to a pawl lifter that is operably coupled to a pawl of the vehicle latch.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
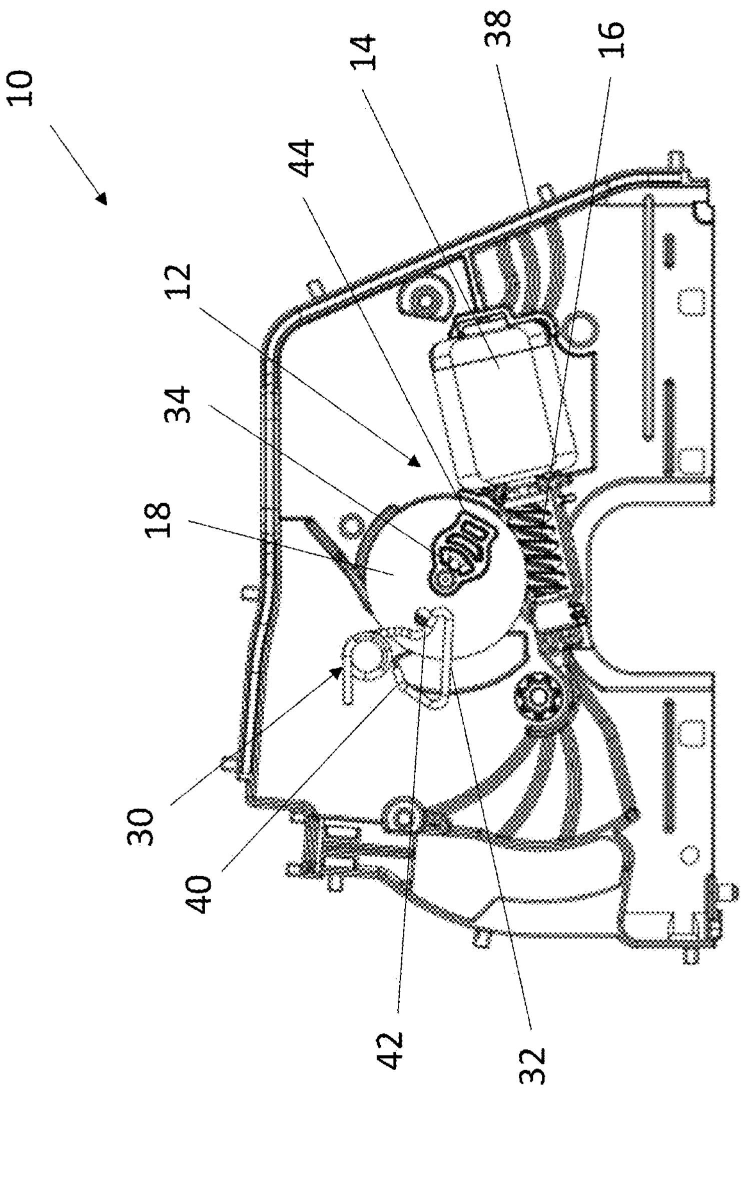
FIG. 1 is a view of the vehicle latch in an initial position when the latch is power released.

A detailed description of one or more embodiments of the disclosed apparatus and method are presented herein by way of exemplification and not limitation with reference to the Figures.

Referring now to the attached FIGS., a side door vehicle latch 10 with power release capabilities is illustrated.

The side door vehicle latch 10 includes a power release mechanism 12 for transitioning the vehicle latch 10 from a latched state to an unlatched state. The power release mechanism 12 includes a motor 14 that rotates a worm 16 that meshingly engages a power release gear 18, which when rotated by the worm 16 causes rotation of a power release lever 20 that when rotated moves and contacts a pawl release lever 22 in order to cause movement of the pawl release lever 22. The pawl release lever 22 is operably coupled to a pawl lifter 24 which is operably coupled to a pawl 26 of the latch. The pawl 26 is configured for movement between an engaged and disengaged position, the pawl 26 when in the engaged position prevents a claw 28 from moving from a latched position to an unlatched position. When the pawl 26 is moved to the disengaged position the claw 28 is free to move from a latched position to an unlatched position. The pawl 26 and claw 28 are rotatably mounted to a backing plate 29 of the vehicle latch 10. In one non-limiting embodiment, the pawl 26 is spring biased into the engaged position by a spring and the claw 28 is spring biased into the unlatched position by a spring.

As mentioned above, the power release mechanism 12 may jam during a back drive operation. This jamming condition could separate the power release gear 18 from the worm 16 and/or deform the gear teeth of the worm 16 and/or the gear 18 thus preventing the power release function of the vehicle latch 10.

To eliminate a jamming condition between the gear 18 and the worm 16 at a high voltage during back drive, a spring 30 is provided to reduce the speed of the gear 18 instead of using the motor 14 or electrical inputs (reducing voltage and changing duty cycle). The spring 30 has a leg 32 that directly contacts a cam 34 the gear 18 that works as a brake during a back drive function of the gear 18.

The spring 30 is operably coupled to a cover 36 of the vehicle latch 10 at one end such that leg 32 is free and can act as brake when it is contacted by the cam 34 as the gear 18 is back driven by the motor 14. The cover 36 is configured to be secured to a complimentary housing 38 of the vehicle latch 10.

FIG. 1 is a view of the vehicle latch in an initial position when the vehicle latch 10 is power released by the power release mechanism 12. In this position, the gear 18 has rotated clockwise with respect to FIGS. 1-3 and 5-7 from a home position (see FIG. 3) such that the cam 34 of the gear 18 has contacted the power release lever 20 and the power release lever 20 has been rotated and pawl moved from the engaged position to the disengaged position such that the claw can move from the latched position to the unlatched position. The power release lever 20 is operably coupled to the pawl release lever 22 which is operably coupled to the pawl lifter 24 which is operably coupled to the pawl 26 of the latch. The pawl 26 is configured for movement between an engaged and disengaged position, the pawl 26 when in the engaged position prevents the claw 28 from moving from a latched position to an unlatched position. When the pawl 26 is moved to the disengaged position the claw 28 is free to move from a latched position to an unlatched position. As such, the gear 18 is operably coupled to the pawl 26.

Figure 2:
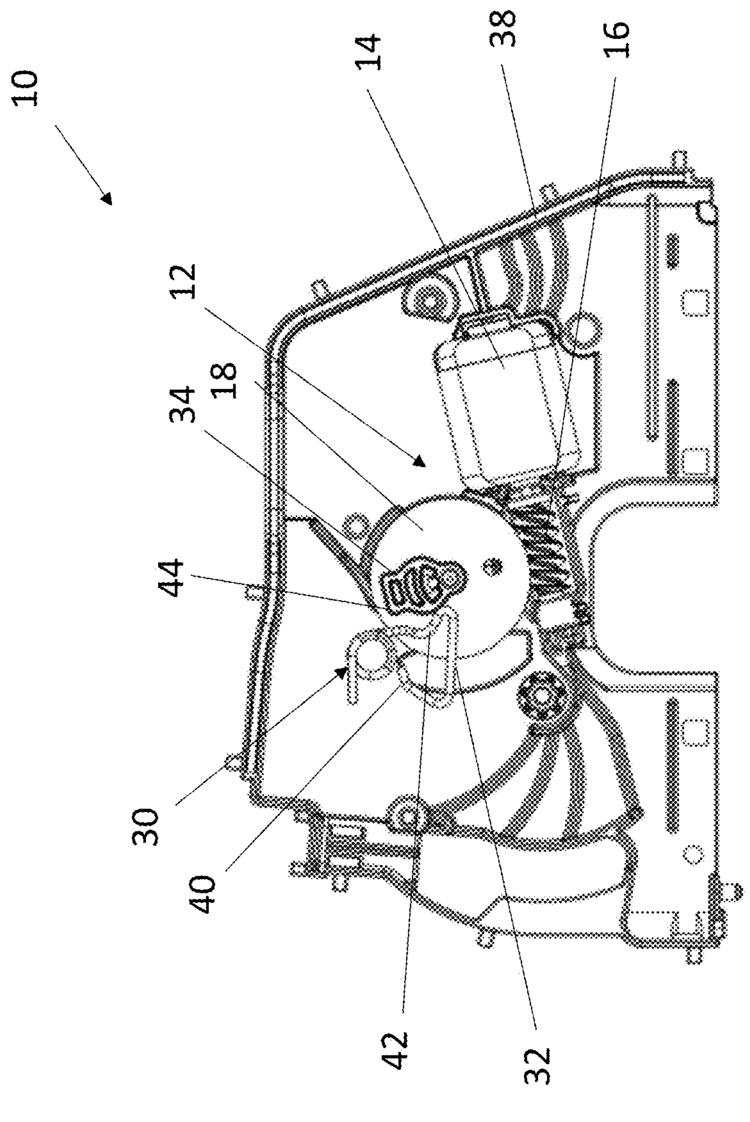
FIG. 2 is a view of the vehicle latch as a gear of a power release mechanism of the vehicle latch is being back driven.
Figure 3:
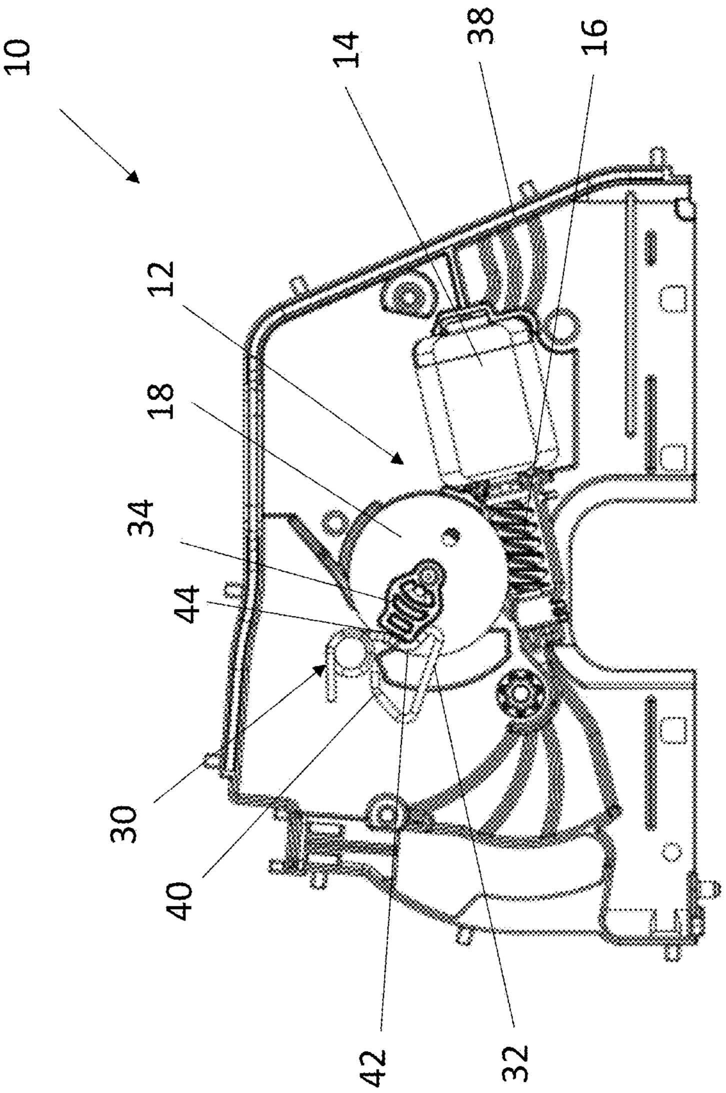
FIG. 3 is a view of the vehicle latch as a gear of a power release mechanism of the vehicle latch is fully back driven.

Once the power release mechanism has moved the pawl to the disengaged position, the gear 18 of the power release mechanism is back driven (counter clockwise with respect to FIGS. 1-3 and 5-7) back to the home position illustrated in FIG. 3.

Figure 4:
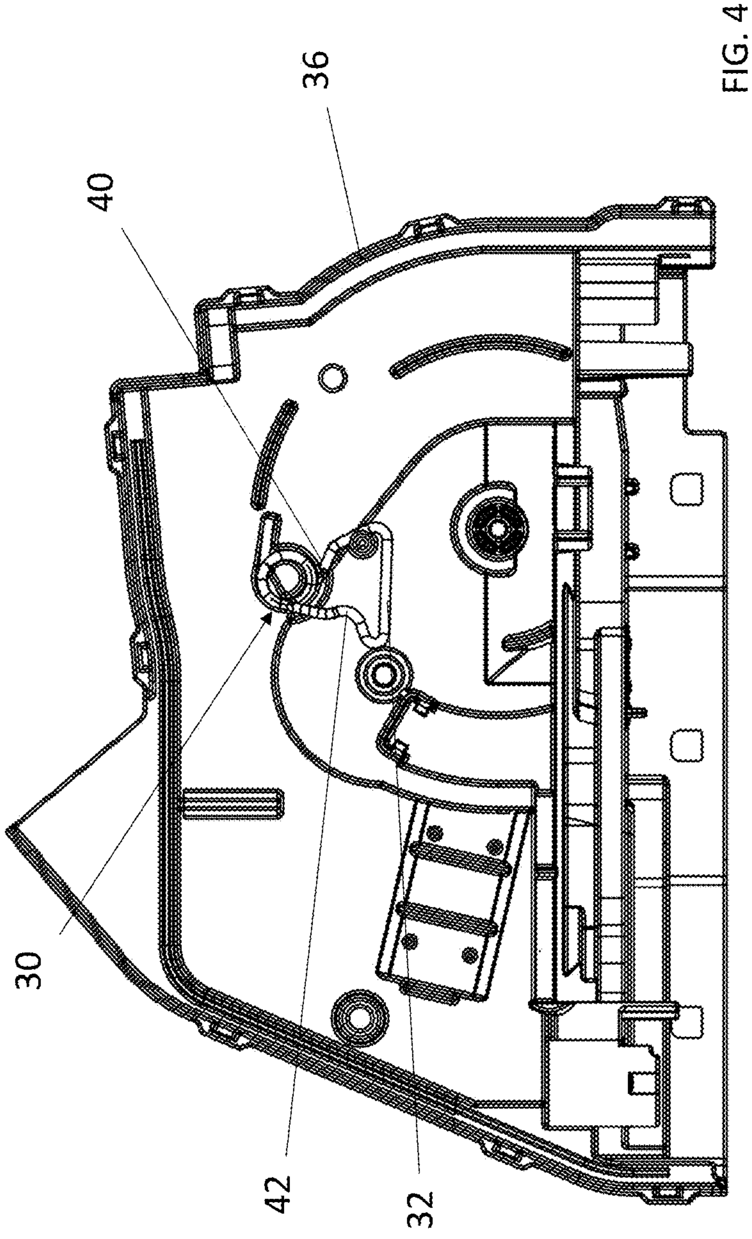
FIG. 4 illustrates retention of a spring to the cover of the vehicle latch.
Figure 5:
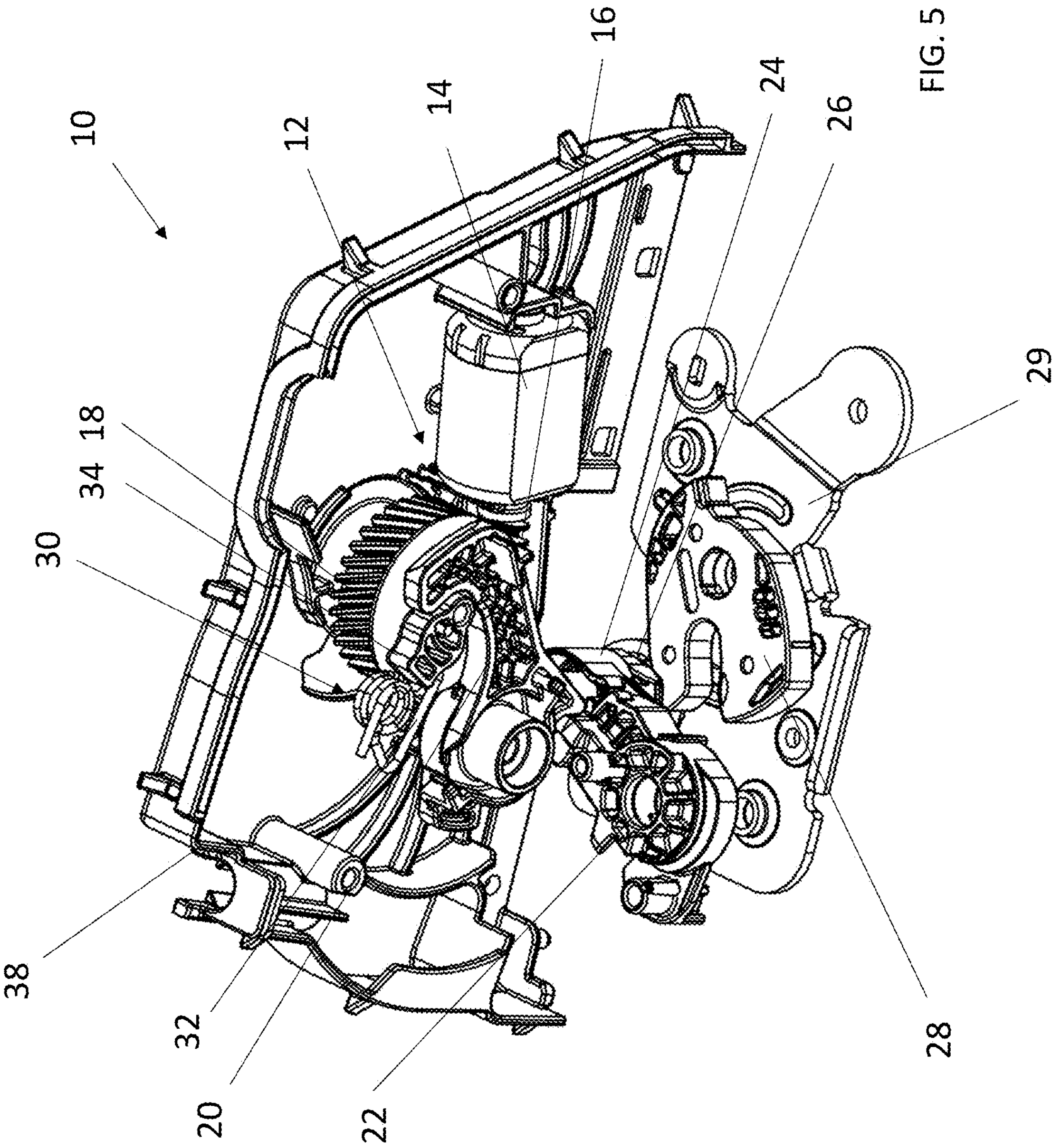
FIGS. 5-7 are perspective views of the vehicle latch when the power release mechanism of the vehicle latch has been fully back driven.
Figure 6:
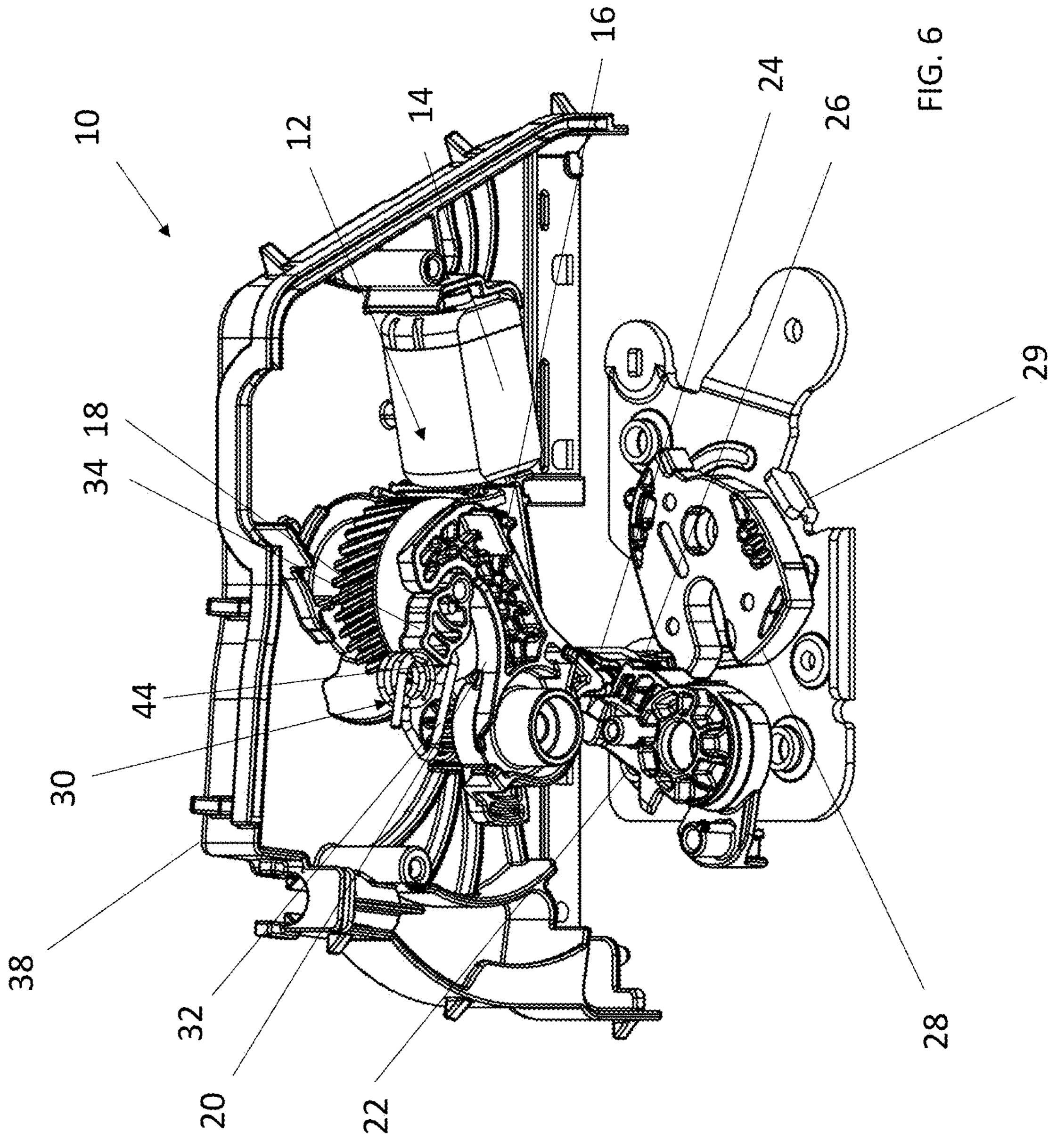
Figure 7:
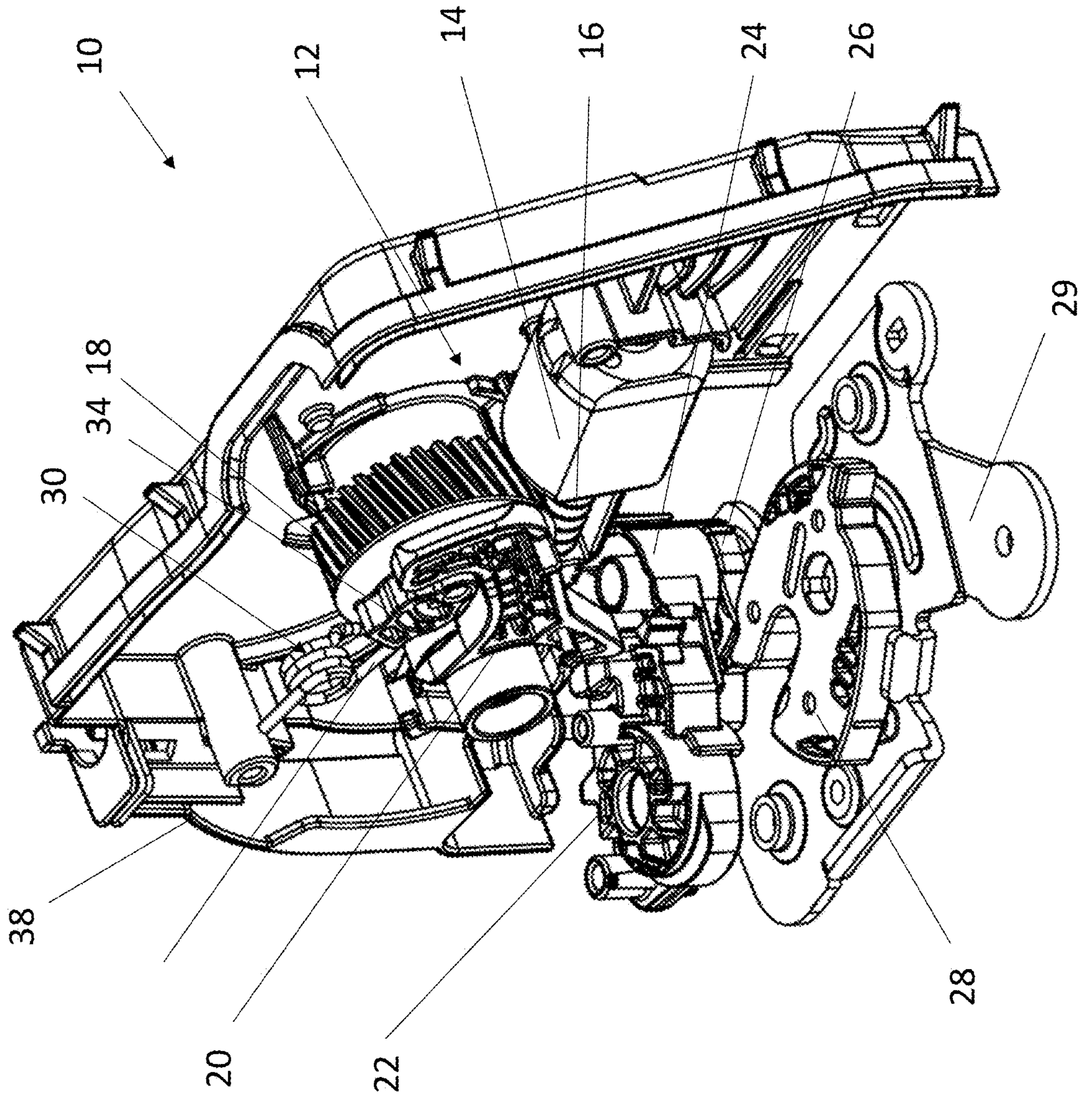

FIG. 2 is a view of the vehicle latch 12 as the gear 18 of the power release mechanism 12 of the vehicle latch 10 after the latch 10 has been power released (claw in unlatched position) and the gear is being back driven in a counter clockwise direction with respect to FIGS. 1-3 and 5-7 back towards the home position of FIG. 3 and the cam 34 of gear 18 contacts the leg 32 of spring 30 and begins to deflect the spring 30. As illustrated in at least FIG. 4, the spring 30 is secured to the cover 36 and the leg 32 of spring 30 has a free end 40. The leg 32 of the spring 30 is also configured to provide a curved or depressed area 42 that is configured to receive a complimentary portion or corner 44 of the cam 34 as the gear is back driven to the home position (FIG. 3).

FIG. 3 is a view of the vehicle latch 12 as the gear 18 of the power release mechanism 12 of the vehicle latch 10 is fully back driven to the home position of the gear and the cam 34 deflects the spring 30 further. For example, the leg 32 due to its free end is capable of deflecting in a clockwise direction with respect to FIGS. 1-3 and 5-7. In this position, the deflected spring acts as a brake to slow the rotation of the gear 18 without an abrupt stop, which as mentioned above may cause a jamming event. Thus, the spring 30 provides an apparatus and method for slowing the rotation of the gear 18 as it ends it rotation back to its home position.

The terminology used herein is for the purpose of describing particular embodiments only and is not intended to be limiting of the present disclosure. As used herein, the singular forms “a”, “an” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A vehicle latch, comprising:

a power release mechanism for transitioning the vehicle latch from a latched state to an unlatched state, the power release mechanism includes a motor that rotates a worm that meshingly engages a power release gear, which is operably coupled to a pawl of the vehicle latch, the power release gear having a cam portion; and a spring operably coupled to a cover of the vehicle latch, the spring having a leg portion that terminates at a free end, the leg portion of the spring defining a curved portion configured to define a curved receiving portion that is configured to receive a portion of the cam portion therein when the power release gear is back driven into a home position by the motor, the spring being configured to reduce a speed of the power release gear as it is back driven into the home position when the portion of the cam portion is received in the curved receiving portion of the leg portion of the spring and the spring is deflected by rotation of the power release gear into the home position, wherein an axis of rotation of the power release gear is not parallel to an axis of rotation of the pawl.

2. The vehicle latch as in claim 1, wherein the spring is operably coupled to a cover of the vehicle latch.

3. The vehicle latch as in claim 2, wherein the cover is configured to be secured to a complimentary housing of the vehicle latch.

4. The vehicle latch as in claim 1, wherein the portion of the cam portion is a corner portion of the cam portion.

5. The vehicle latch as in claim 1, wherein the power release gear is operably coupled to a power release lever, the power release lever being operably coupled to a pawl release lever which is operably coupled to a pawl lifter that is operably coupled to the pawl.

6. The vehicle latch as in claim 1, wherein the curved receiving portion is spaced from the free end of the leg portion.

7. A method of slowing rotation of a gear of a power release mechanism of a vehicle latch, comprising:

rotating the power release gear of the power release mechanism into a home position; and contacting and deflecting a spring secured to a cover of the vehicle latch with a cam of the power release gear as the power release gear is rotated into the home position by a motor, the spring having a leg portion that terminates at a free end, the leg portion of the spring defining a curved portion configured to define a curved receiving portion that is configured to receive a portion of the cam therein when the power release gear is back driven into the home position by the motor, the spring being configured to reduce a speed of the power release gear as it is back driven into the home position when the portion of the cam is received in the curved receiving portion of the leg portion of the spring and the spring is deflected by rotation of the power release gear into the home position, wherein the leg portion of the spring has a linear portion located between the curved receiving portion and the free end of the leg portion.

8. The method as in claim 7, wherein the spring is operably coupled to the cover of the vehicle latch.

9. The method as in claim 8, wherein the cover is configured to be secured to a complimentary housing of the vehicle latch.

10. The method as in claim 7, wherein the portion of the cam is a corner portion of the cam.

11. The method as in claim 7, wherein the power release gear is operably coupled to a power release lever, the power release lever being operably coupled to a pawl release lever which is operably coupled to a pawl lifter that is operably coupled to a pawl of the vehicle latch.

12. The method as in claim 7, wherein the curved receiving portion is spaced from the free end of the leg portion and an axis of rotation of the power release gear is not parallel to an axis of rotation of a pawl of the vehicle latch and the power release gear is operably coupled to a power release lever, the power release lever being operably coupled to a pawl release lever which is operably coupled to a pawl lifter that is operably coupled to the pawl.

13. A vehicle latch, comprising:

a power release mechanism for transitioning the vehicle latch from a latched state to an unlatched state, the power release mechanism includes a motor that rotates a worm that meshingly engages a power release gear, which is operably coupled to a pawl of the vehicle latch, the power release gear having a cam portion; and a spring operably coupled to a cover of the vehicle latch, the spring having a leg portion that terminates at a free end, the leg portion of the spring defining a curved portion configured to define a curved receiving portion that is configured to receive a portion of the cam portion therein when the power release gear is back driven into a home position by the motor, the spring being configured to reduce a speed of the power release gear as it is back driven into the home position when the portion of the cam portion is received in the curved receiving portion of the leg portion of the spring and the spring is deflected by rotation of the power release gear into the home position, wherein the leg portion of the spring has a linear portion located between the curved receiving portion and the free end of the leg portion.

14. The vehicle latch as in claim 13, wherein the curved receiving portion is spaced from the free end of the leg portion.

15. The vehicle latch as in claim 14, wherein an axis of rotation of the power release gear is not parallel to an axis of rotation of the pawl.

16. The vehicle latch as in claim 15, wherein the power release gear is operably coupled to a power release lever, the power release lever being operably coupled to a pawl release lever which is operably coupled to a pawl lifter that is operably coupled to the pawl.

17. The method as in claim 7, wherein the curved receiving portion is spaced from the free end of the leg portion.

18. The method as in claim 7, wherein an axis of rotation of the power release gear is not parallel to an axis of rotation of a pawl of the vehicle latch.

* * * * *